No. 854,683. PATENTED MAY 21, 1907.
C. H. AYARS.
CAN FILLING MACHINE.
APPLICATION FILED DEC. 28, 1904.
2 SHEETS—SHEET 1.
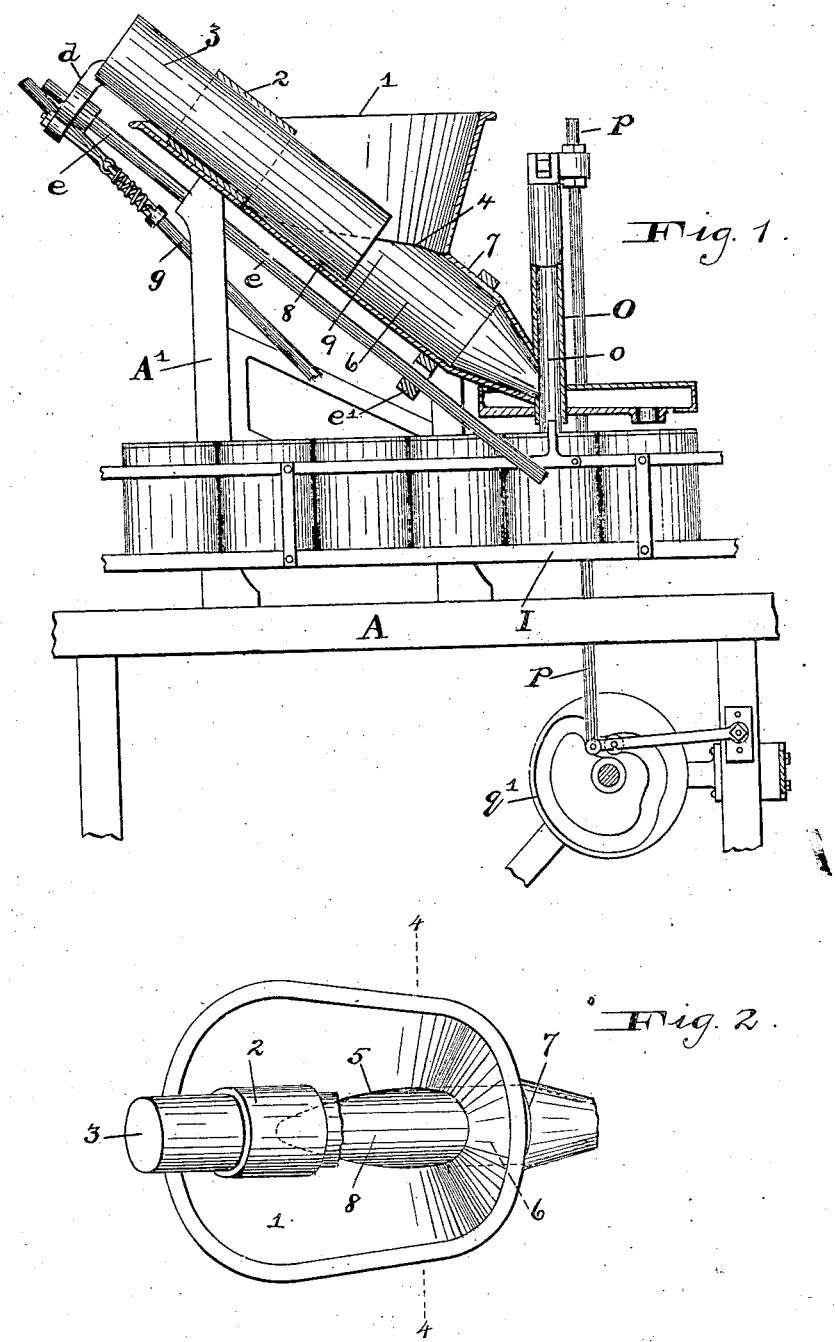

No. 854,683. PATENTED MAY 21, 1907.
C. H. AYARS.
CAN FILLING MACHINE.
APPLICATION FILED DEC. 28, 1904.

2 SHEETS—SHEET 2.

Witnesses.
J. H. Sirich Jr.
J. Ferdinand Vogt.

Inventor.
Charles H. Ayars
By Mann & Co.
Attorneys.

UNITED STATES PATENT OFFICE.

CHARLES H. AYARS, OF SALEM, NEW JERSEY, ASSIGNOR TO AYARS MACHINE COMPANY, A CORPORATION OF NEW JERSEY.

CAN-FILLING MACHINE.

No. 854,683.  Specification of Letters Patent.  Patented May 21, 1907.

Application filed December 28, 1904. Serial No. 238,634.

*To all whom it may concern:*

Be it known that I, CHARLES H. AYARS, a citizen of the United States, residing at Salem, in the county of Salem and State of New Jersey, have invented certain new and useful Improvements in Can-Filling Machines, of which the following is a specification.

This invention relates to improvements in can filling machines, such for example as are employed for filling whole tomatoes into cans.

The value of canned goods is very much enhanced if the fruit or vegetable is in a whole or unbroken condition after it is filled into the can, and while this is a recognized fact by those practically engaged in the art, the machines now employed in filling cans, to a greater or less degree, cut or crush the fruit or vegetable when forcing the latter from the storage hopper into the can. This latter is particularly true in machines where the hopper is provided with a discharge tube or nozzle into which a plunger is moved to force the material, for the reason that the plunger suddenly enters the inner end of the tube and cuts or crushes the vegetable against the tube mouth as it enters the latter.

My invention therefore has for its object to provide a hopper-discharge construction which will substantially avoid the cutting or crushing of the tomatoes during the filling operation.

The inventive idea as heretofore expressed may be embodied in machines of various forms and constructions, but for the sake of illustration I have preferred to show the invention in connection with a form of machine heretofore invented by me and shown in several Letters Patent granted to me, such for example as Patent No. 722,075 dated March 3rd, 1903 and No. 652,581 of June 26th, 1900.

For the sake of brevity a portion only of the filler machine is illustrated in the accompanying drawing as the details of construction and the operation of the same are fully illustrated and described in my said prior patents.

Figure 3:
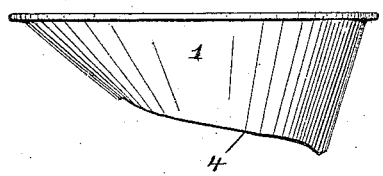
Figure 5:
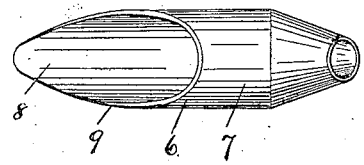
Figure 4:
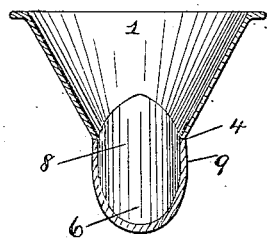
Figure 6:
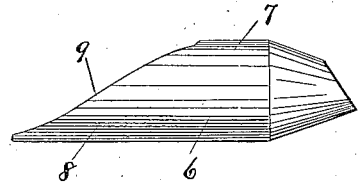

In the accompanying drawing: Figure 1, illustrates the upper portion of the filler machine and a sectional elevation of the hopper and its discharge passage. Fig. 2, illustrates a diagrammatic plan view of the hopper, plunger and concave discharge-passage. Fig. 3, is a detail side elevation of the hopper. Fig. 4, is a vertical section through the hopper and discharge passageway,—the section being taken on the line 4—4 of Fig. 2. Fig. 5 shows a plan view of the detached discharge-tube and concave passageway, and Fig. 6 illustrates a side elevation of the same.

In the drawing, A, designates a supporting frame on which are brackets, $A^1$, which sustain the hopper, 1. The hopper has the general form of a funnel with walls that incline or converge; at the lowermost part of the hopper is an outlet, 6, having a tubular projecting discharge end, 7. A continuation of the tubular discharge toward the left-hand, as it is shown in the drawing, has its upper portion cut away on an inclination with respect to the tubular discharge end and the inclined cut away portion extends back under the hopper and thereby forms a concave passage, 8, which is depressed below the hopper and whose wall, 9, gradually diminishes in height as it recedes from the tubular end. By thus cutting the tube which forms the discharge nozzle on an angle with respect to its longitudinal tubular passage the said passage will have its upper end even with, or in the same plane with, the hopper-wall, and therefrom it will have a gradually increasing vertical depth as it advances toward the discharge end. The edges of the inclined walls, 9, of the concave passage are secured to the lower edge, 4, of the hopper, and the depressed concave passage, 8, extends downwardly in an inclined direction beneath the hopper.

Near the upper portion of the hopper at the side diametrically opposite the discharge outlet, 6, is a stationary guide, 2, through which a plunger, 3, is reciprocated in an inclined position by devices to be hereinafter described. This plunger in cross-section has a size and shape to fill the concave passage, 8, and the tubular discharge end. When the plunger is reciprocated to force the tomatoes from the hopper through the discharge outlet, 6, the lower end of the plunger will first enter the shallow part of the inclined concave passage, 8, and as its end advances into the deeper part it becomes gradually inclosed by the increasing depth of the concave walls, 9, until it finally enters the discharge outlet, 6. It will be seen that the construction is such that those tomatoes in said depressed passage and in the path of the plunger which cannot enter the discharge outlet, will be displaced and pushed laterally out of the path of the plunger and therefore will not be crushed as the end of the plunger enters the tubular portion of the discharge.

At the lower outer end, 7, of the discharge-nozzle the machine in the present instance, is provided with a vertical tube, O, into which said nozzle discharges and from the latter the material to be packed is discharged into a can which is supported on a table, I. At the upper end the plunger is provided with a cross-head $d$, and a guide-rod, $e$, is connected at its upper end to said cross-head while its lower end passes through a bearing, $e^1$. A rod, $g$, is connected to the cross-head, and is operated as described in my said prior patents, to cause the plunger to be reciprocated in an inclined direction. A cam, $q^i$, and rod, $p$, serve to operate a plunger, $o$, in the vertical tube, O, to discharge the contents, as is also fully described in my said prior patents.

From the foregoing description, it is to be understood that the improvement consists in providing at the lower inclined portion of the hopper, a special depressed concave passageway which gradually increases in depth as it advances toward the discharge outlet, and in arranging that the plunger in cross-section shall have a size and shape that will fill said passageway so that as the plunger advances toward the discharge outlet it will gradually become inclosed or surrounded.

Having thus described my invention what I claim as new and desire to secure by Letters Patent is,—

1. A can-filling machine having a hopper provided with a discharge outlet; a concave passage at the lower side of said hopper and leading into the said discharge outlet—said concave passage gradually increasing in depth as it extends toward said outlet, and a plunger movable from the shallowest end of the said concave passage toward the deepest end and which gradually becomes inclosed or surrounded as it advances to enter said outlet.

2. A machine of the class described having a hopper with inclined walls and provided with a discharge outlet; a passageway depressed below the hopper walls and leading to said outlet—said passageway gradually increasing in depth as it advances toward said outlet, and a reciprocable plunger of size and shape to fill said passageway.

3. A machine for filling tomatoes and the like into cans having a hopper with inclined converging walls and an outlet, and provided with an inclined passage gradually increasing in depth as it advances to the outlet; a guide attached to the hopper diametrically opposite the outlet; and a plunger moving through the guide and entering the shallowest end of the inclined passage and advancing along said passage toward the deepest end thereof to gradually cut off the discharge from the hopper.

In testimony whereof I affix my signature in presence of two witnesses.

CHARLES H. AYARS.

Witnesses:
PAUL J. DRISCOLL,
ANNA MCEVOY.